United States Patent

[11] 3,612,663

| [72] | Inventors | Albrecht W. Tronnier<br>Gottingen;<br>Joachim Eggert, Braunschweig; Fritz<br>Uberhagen, Braunschweig, all of Germany |
|---|---|---|
| [21] | Appl. No. | 832,301 |
| [22] | Filed | June 11, 1969 |
| [45] | Patented | Oct. 12, 1971 |
| [73] | Assignee | A.G. Voigtlander |
| [32] | Priority | June 14, 1968 |
| [33] | | Switzerland |
| [31] | | 8894/68 |

[54] WIDE-APERTURE OBJECTIVE OF THE EXPANDED DOUBLE-ANASTIGMAT TYPE HAVING AN INNER BICONEX DIAPHRAGM-SPACE AND A CONCAVE FRONT SURFACE TOWARD THE DISTANT OBJECT
6 Claims, 10 Drawing Figs.

[52] U.S. Cl. .................................................. 350/214,
350/173, 350/202, 350/215, 350/216
[51] Int. Cl. ........................................................ G02b 9/62,
G02b 9/64, G02b 27/14
[50] Field of Search............................................ 350/214,
215, 216, 218, 220

[56] References Cited
UNITED STATES PATENTS

| 2,831,396 | 4/1958 | Klemt........................... | 350/214 X |
| 3,010,367 | 11/1961 | Miles............................ | 350/215 X |

*Primary Examiner*—John K. Corbin
*Attorney*—Blum, Moscovitz, Friedman & Kaplan

ABSTRACT: An objective of relatively wide aperture which is of the expanded double-anastigmat type and which has an inner diaphragm. The diaphragm is situated in an air space which defines the diaphragm chamber and which is of a dispersive configuration, this air space separating a forward component situated on the longer conjugate side of the air space from a rear component situated on the smaller conjugate side of the air space. The forward component terminates in opposite end surfaces both of which are concave so as to provide the forward component in its entirety with the configuration of a biconcave lens. The curvature of the concave front end surface of the component is determined by a radius the length of which is greater than two-thirds of the focal length of the objective without exceeding ten-thirds of this focal length calculated absolutely. This forwardly directed concave front end surface of the objective not only functions in a dispersive manner but also has an overcorrective action with respect to image errors.

INVENTORS
A.W. TRONNIER
Joachim EGGERT
Fritz ÜBERHAGEN

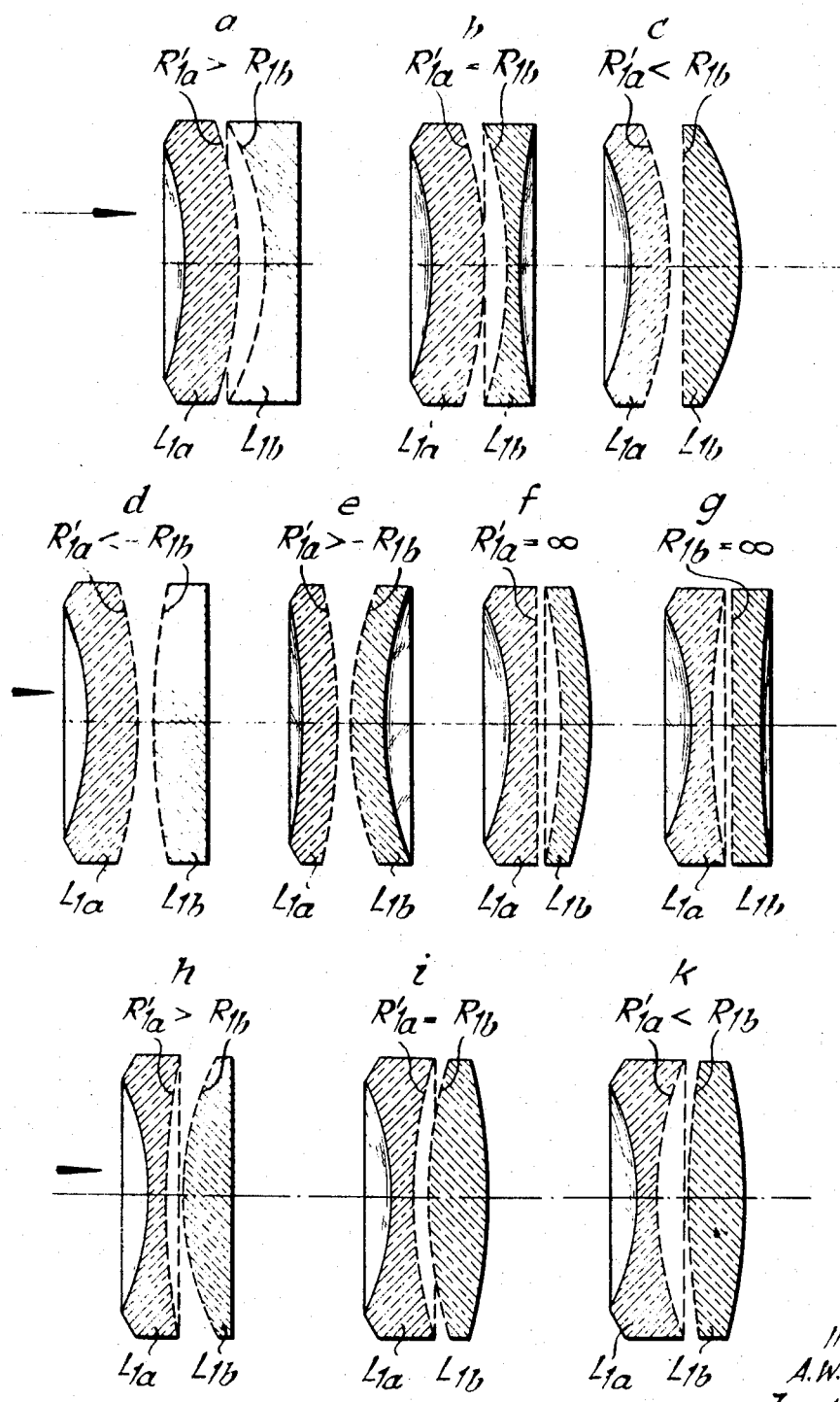

TABLE A
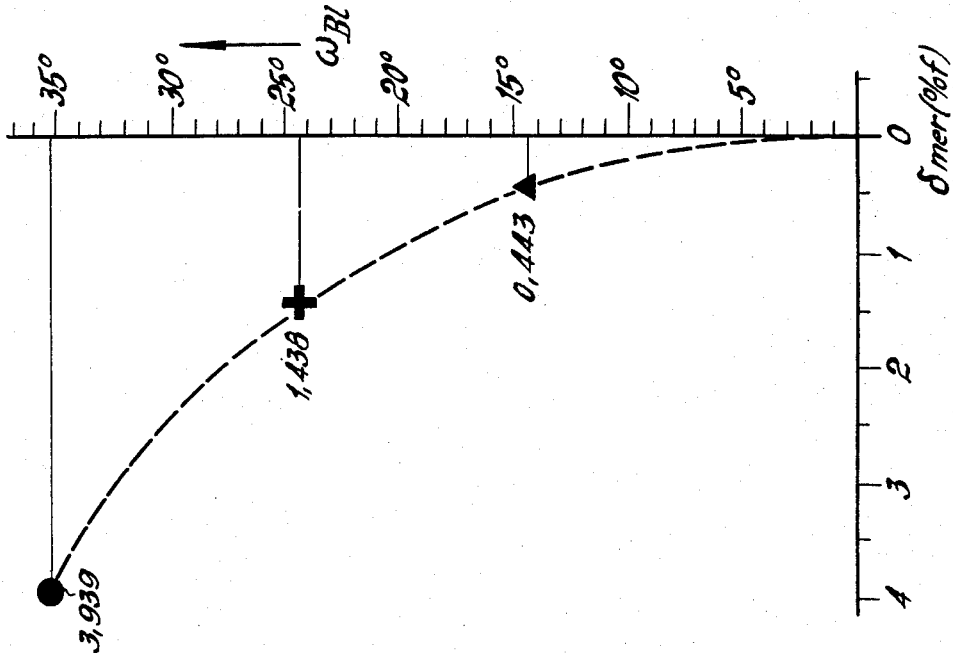
FIG. γ
VARIATION TANG. ABERR.
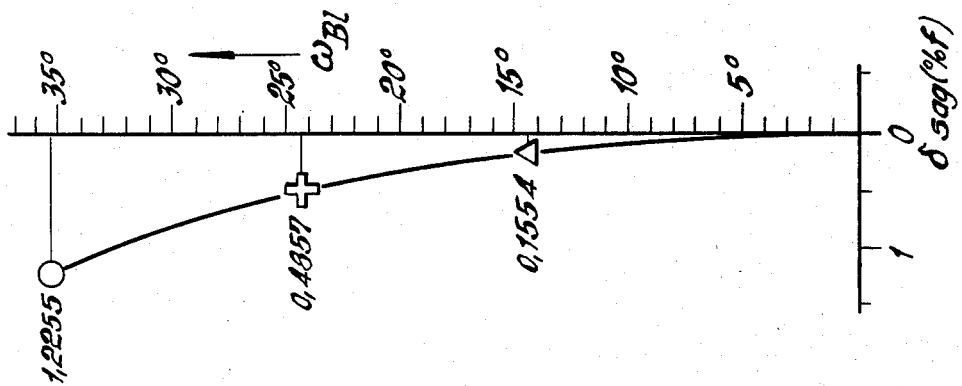
FIG. β
VARIATION SAG. ABERR.
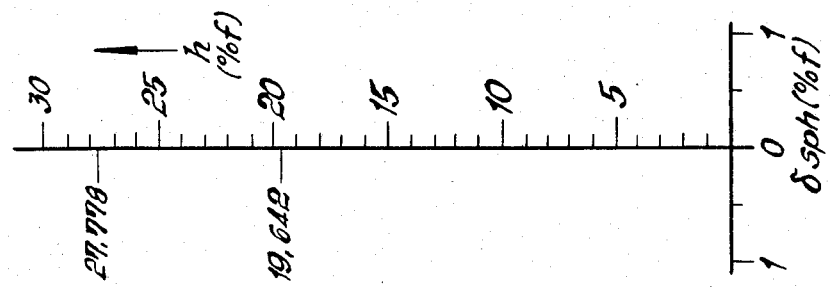
FIG. α
VARIATION SPH. ABERR.
INVENTORS
A.W. TRONNIER
Joachim EGGERT
Fritz ÜBERHAGEN
BY
their ATTORNEYS

TABLE B

VARIATION LONGITUD. COMA

WIDE-APERTURE OBJECTIVE OF THE EXPANDED DOUBLE-ANASTIGMAT TYPE HAVING AN INNER BICONEX DIAPHRAGM-SPACE AND A CONCAVE FRONT SURFACE TOWARD THE DISTANT OBJECT

BACKGROUND OF THE INVENTION

The present invention relates to expanded double-objectives having spherical, astigmatic and comatic corrections, which while having a wide aperture at the same time are provided with an extended viewing field. This objective of the invention has between its ends a diaphragm chamber which accommodates an interior diaphragm so that the objective is characterized as a double-anastigmat since the forward component at the side of the longer conjugate as well as the rear component on the other side of the diaphragm chamber at the side of the shorter conjugate are both provided with a positive refractive power. Within this primarily Gauss type of double-objective is the new system of the invention which in contrast with known techniques has a new type of forward component which terminates at its front end in an end surface which is not convexly curved in a forward direction toward a distant object so as to have a positive front end surface but instead has forwardly directed toward a distant object a concave front end surface which is dispersing and which in addition acts in an overcorrecting manner with respect to image errors.

SUMMARY OF THE INVENTION

It is thus an object of the invention to provide an objective of the double-anastigmat type having an interior diaphragm and a relatively wide aperture and capable of avoiding the drawbacks of known objectives of this general type.

Thus, it is an object of the invention to provide an objective of this type which is capable of reducing the image errors to an extent greater than has heretofore been possible.

Furthermore, it is an object of the invention to provide an objective which includes relatively simple, rugged elements which will achieve the desired objects, with all of the curved surfaces of the several lenses forming parts of spheres.

With the new objective of the invention the forward component which forms the front half of the Gauss type of double-objective directed toward the longer conjugate does not have the conventional configuration of a concave meniscus directed toward the diaphragm but instead has the configuration of a biconcave lens. As a result of this new configuration it is possible to achieve for the lateral imaging of the outer-axial parts of the viewing field an overall important situation for the entrance pupil which no longer is in the region of the center of curvature of the front end surface of the objective but instead provides a large distance between this center of curvature of the front end surface and the geometric location of entrance pupil. In this way it is possible to provide an angle for the inclined rays at the dispersing and thus overcorrecting front end surface which is greater than the primary ray inclination with respect to the optical axis. In this exceedingly simple manner, because of the large entrance angle value, as contrasted with the construction of known expanded Gauss objectives, there is now no longer a very small but rather a very large difference between the paraxial surface refractive power and the astigmatic surface refractive power provided for a particular lateral primary ray. In this way it is possible to achieve in the first place for a Gauss objective, in contrast with the present state of the art, a particularly convenient manipulation of the astigmatic image point deviation in the lateral viewing field, without being required to take into consideration that there will at the same time be a particularly great or a particularly undesirable enlargement of the already present small finite magnitudes of comatic residual image errors.

Because of the biconcave form of the central aperture chamber of the Gauss double-objective, as a result of which the diaphragm chamber itself acts as an extremely intense dispersive air lens, up to the present time with expansions of this type of objective has included an additional lens in the form of a hollow meniscus directed toward the location of the diaphragm so that the angle of impingement of the lateral rays at this lens is maintained as small as possible while with the present invention a precisely opposite proposal is made and the front end surface of the entire objective which is most distant from the diaphragm is given a negative operating sign and thus this arrangement opens the way for a particularly great lateral receiving and correspondingly refracting angle. Thus, the forward component at the side which is directed toward a distant object ends at its front end in a concave surface which limits the front lens of this forward component and which in the simplest manner has the construction of a single individual lens which, however, in order to fulfill particular objects may be composed of an assembly of two or more partial lenses.

BRIEF DESCRIPTION OF DRAWINGS

The invention is illustrated by way of example in the accompanying drawings which form part of this application and in which.

Figure 1:
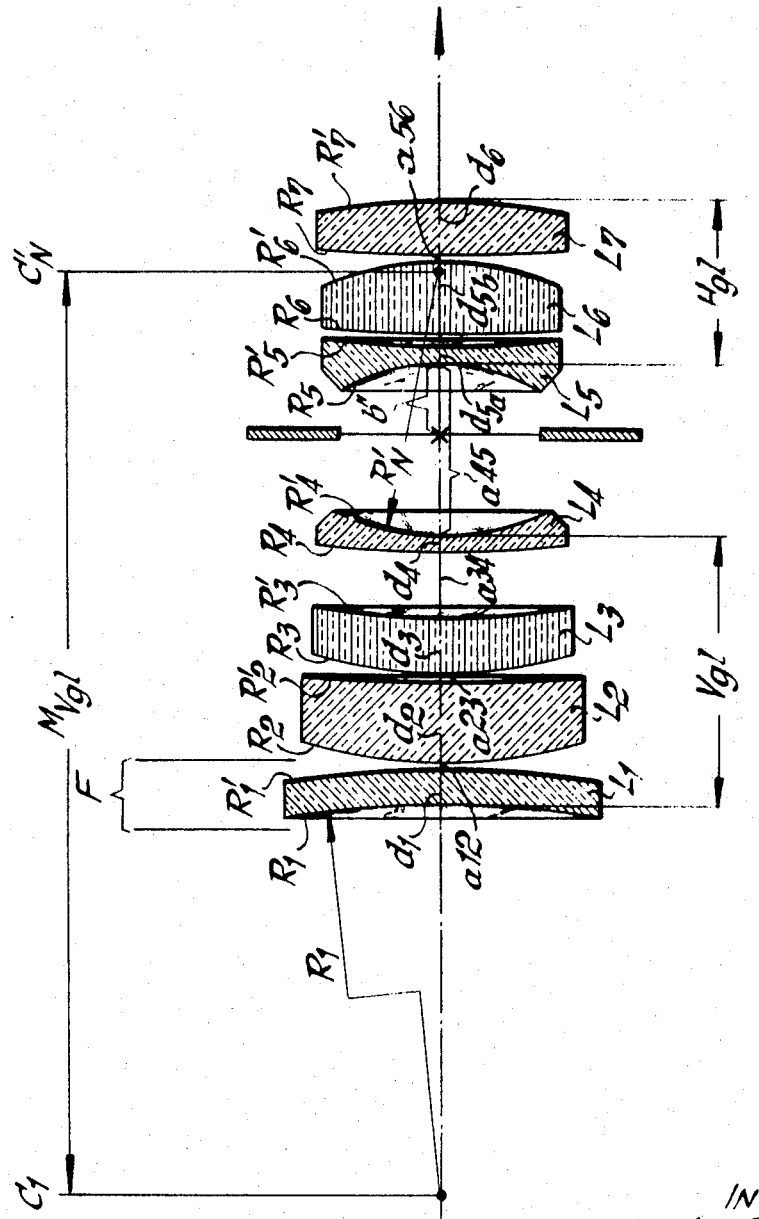
FIG. 1 is a schematic representation of an expanded double objective the invention various parts of which are designated by reference characters corresponding to those used in the data tables which follow, FIG. 1 particularly illustrating the biconcave form of the forward component as well as the distance between the centers of curvature of the concave end surfaces of the forward component.

TABLE A has FIGS. α–γ showing various curves; and

TABLE B shows a further set of curves.

DESCRIPTION OF PREFERRED EMBODIMENTS

With the simplest form of the invention, the front lens will have the configuration of a positive meniscus when the rear surface thereof which is directed toward the diaphragm has a radius of curvature smaller than that of the concave front surface thereof. This form will then go over to the v. Hoegh type of zero lens when the radius of the rear surface is flattened to such an extent that it has the same length as the radius of the concave front surface. When the rear surface is flattened still further, then the front lens F progresses from the form of a zero lens into the form of a negative meniscus, so that during further progression of this flattening the radius of the rear surface of the front lens approaches the form of a planoconcave lens. If the rear surface of the front lens F is given a positive sign, then the front lens will increasingly taken on a biconcave configuration.

These new expanded double-anastigmats are provided in their wide-aperture forms with extended viewing fields or with average apertures and extremely large imaging angles primarily, as mentioned above as modifications of the Gauss type of objective where there is a successful suitability for a wide-apertured imaging system with a relatively large imaging angle without, however, limiting the invention to this special construction, in spite of the fact that for didactic reasons and to facilitate comparison by a person skilled in the art the next-following explanations and examples for the sake of simplicity relate to this successful basic arrangement of lens structure where there is a double objective with an interior diaphragm which is of wide aperture and deviates more or less from a symmetrical arrangement.

In accordance with the invention, the forward component of the new double objective which is directed toward a distant object, in correspondence with the above points and in contrast with the state of the art, is provided with an exterior biconcave lens configuration having a Gardner-shape factor, the absolute value of which ($\sigma$) is between 0.500 and 0.833. The object area at the side of the longer conjugate is limited by a concave front lens surface having a radius which is greater than two-thirds of the entire focal length f. of the objective without, however, exceeding ten-thirds of this latter value, absolutely calculated. Moreover, referring to FIG. 1, the distance between the center of curvature $C_1$ of the concave front surface of radius $R_1$ directed toward a distant object and the center of curvature $C'_N$ of the concave surface defining part of the diaphragm chamber the rear of the forward component where this rear concave surface of the forward component is directed toward the shorter conjugate and has a dispersing exterior radius $R'_N$ is indicated as the sum (center point distance $M_{Vgl}$) of the absolute lengths of the radius of the forwardly directed front concave surface plus the distance between the vertices of the concave end surfaces along the optical axis where the surfaces intersect the optical axis plus the length of the rear dispersing radius $R_N$. This value $M_{Vgl}$ is 1.20 times the equivalent focal length of the entire objective while remaining smaller than 3.80 times this latter value. Thus, the dispersing interior diaphragm chamber is in addition curved in such a way that the surface which defines this chamber at the side of the shorter conjugate having a radius $R''_b$ which forms the radius of the initial front concave surface of the rear component, has with respect to the front radius $R_1$ of the entire objective a Gardner-shape factor ($\sigma''_b$) which is greater than minus 1.10 without however, being more than minus 1.80. Furthermore, the front lens F which is provided with a concave front surface of radius $R_1$ has a lens refractive power ($\Phi_F$) which has an absolute value situated within a known range for an objective front lens of between 0 on the one hand and $0.30\Phi$ on the other hand.

The above constructive principles upon which the invention is based thus includes a combination of five features, which in formula form are as follows:

$$0.500 < -\sigma_{Vgl} < 0.833 \quad (1)$$
$$2/3f. < -R_1 < 10/3 \, f. \quad (2)$$
$$1.20f. < M_{Vgl} < 3.80f. \quad (3)$$
$$1.10 < -\sigma''_b < 1.80 \quad (4)$$
$$0 < |\phi F| < 0.30\Phi \quad (5)$$

In these latter formulas, in series, the distance between the centers of curvature of the front and rear concave surfaces of the forward component (the surfaces having the radii $R_1$ and $R'_N$), taking into consideration the sign of the radius $R_1$, may be represented by the following:

$$M_{Vgl} = R'_N + S_{Vgl} - R_1$$

In this latter relationship the value $S_{Vgl}$ is an abbreviation for the sum of all of the lens thicknesses and air distances therebetween along the optical axis between the crests of the front and rear concave surfaces of radii $R_1$ and $R'_N$, so that the sum $S_{Vgl}$ is designated as the distance between the crests of the front and rear concave surfaces of the forward component Vgl. In addition f. designates the equivalent focal length of the entire objective and $\Phi$ the equivalent refractive power for the entire objective.

In carrying out these new principles of construction as a combination of the above five features, there is a very decided advance achieved even in the simple case where the front lens F is in the form of a simple individual lens situated in air and also in those cases where the front lens has an extremely weak individual refractive index, insofar as it is only not made so extremely thin that it can be considered as the equivalent of an infinitely thin lens. This latter type of construction in any event is eliminated in practice since the front lens because of its large diameter for technical manufacturing reasons cannot be made infinitely thin but instead must be provided with a finite thickness. This latter thickness in accordance with the invention is measured in such a way that relative to the length of the front radius $R_1$ on the one hand it is less than one-eighth of the latter while on the other hand it is greater than one-eightieth of this latter radial length.

Insofar as the front lens takes the above-mentioned form of a v. Hoegh zero lens, its action is very different from the known optical action of the original zero lens, as is known from the literature on the subject (see for example A. Gleichen: "Lehrbuch der geometrischen Optik," Verlag B. G. Teubner, Leipzig und Berlin, 1902, 19. Kapitel, Abschnitt 314, Seiten 483–485), and where the average thickness of 0.5333....R is greater than 50 percent of the limiting exterior radius of the concave surface.

The extremely different action results in the fact that the v. Hoegh zero lens is situated at the diaphragm region in the vicinity of both centers of curvature of the surfaces and thus primarily between the latter and therefore carries out the known imaging relation, while with the structure according to the invention the diaphragm is situated in the direction of light travel relatively distant from and behind the front lens F, so that there is a completely different ray course as well as a completely different action on the imaging relationships particularly for the lateral ray paths through the objective by way of the front lens F and thus a significant advance greatly improving the quality of the image of an expanded double objective is achieved with the invention.

In order to bring about a structure according to the invention where there is a front lens having a concave front surface, receiving rays from a distant object in an aberrationless manner so that the rays are initially influenced dioptrically by this front lens, the arrangement of the invention, in contrast with the state of the art where the Gauss modification is provided with a concave front surface directed toward the longer conjugate, the front surface having an astigmatic surface refractive power for the object-side primary ray refraction at the lateral surface of ray impingement where the new lens becomes substantially greater than the paraxial surface refractive power of this surface. The next following data table shows this factor which is made use of by the invention for the first time in a very clear manner. In this table the glass which is used is a heavy crown barium Schott SK 16 ($n_d$=1.62040). For a distance of the entrance pupil from the axial crest of the front surface of $x_{EP}$=+0.550 f., the astigmatic surface refractive power $\Phi_A$ and the paraxial surface refractive power $\Phi_P$ (absolutely calculated) as well as the percent value of the magnitude of $\Phi_A$ as compared to $\Phi_P$, and finally the percent difference of the same ($\delta\%$).

These absolute values are designated in the left table column for the radius $R_1$=+1.000 f. and in the right column for the radius $R_1$=−1.000 f. Thus, for a unit of focal length of f.=100.00 mm. in the left column the front surface radius is equal to +100.00 mm. and in the right column this radius equals −100.00 mm. In the upper half of the table there is in correspondence with the data presented at the object side a primary ray inclination angle with respect to the optical axis of $\omega_1$=15°0', while in the lower half of the table the primary ray inclination angle $\omega_1$=22°30'.

| $w_1$ | $R_1$ | | Factors |
|---|---|---|---|
| | +1.000 f. | −1.000 f. | |
| 15°0' | 0.623 013 | 0.653 943 | $\Phi_A$ |
| | 0.620 400 | 0.620 400 | $\Phi_P$ |
| | 100.421 18 | 105.406 67 | % |
| | +0.421 18% | +5.406 67% | $\delta\%$ |
| 22°30' | 0.626 148 | 0.702 846 | $\Phi_A$ |
| | 0.620 400 | 0.620 400 | $\Phi_P$ |
| | 100.926 50 | 113.289 17 | % |
| | +0.926 50% | +13.289 17% | $\delta\%$ |

In the above table:
$\Phi_P = (n'-n):R$ and
$\Phi_A = (n' \cdot \cos\beta - n \cdot \cos\alpha):R$ Where $R$ is the surface radius, $\alpha$ the ray-receiving angle and $\beta$ the refractive angle of the inclined primary ray, and where $n$ and $n'$ designate the glass refractive power before and after the lens surface.

For these dimensions the corresponding receiving angle for the rays with conventional convex front surface lenses $\alpha_1 = 6°41'18''$, while in contrast for the concave front surface according to the invention there is $23°39'0''$ for a primary ray inclination $\omega_1 = 15°0'$. For the larger ray inclination of the lower half of the table there are the corresponding values $\alpha_1 = 9°54'0''$ for the convex front surface, which contrasts with the angle where the concave front surface is used of $\alpha = 36°22'53''$ for the primary ray inclination angle of $22.5°$.

From these latter values it can be directly seen that the dioptric ray receiving angle of such great significance with a conventional construction of the front surface is only 44.072 percent and thus less than half of the corresponding primary ray inclination angle. However, from the table, the arrangement of the invention shows in contrast that this angle is approximately 61.695 percent greater and thus corresponds to more than half the primary ray inclination angle, so that with the invention a successful solution to the problem of achieving high manipulability for the lateral imaging capability is achieved in an outstanding manner.

The objectives according to the invention thus are not only in sharp contrast to the expansions of known double anastigmats with interior diaphragms as used up to the present time, but in addition they are also in sharp contrast with a newly proposed expansion of a nonsymmetrical anastigmat where the different subgroups of an expanded triplet are used. With this expanded triplet the lateral corrections are achieved primarily by way of a glass lens in the interior of the objective of dispersive characteristics made of a single lens element or a group of lens elements and having a more or less high refracting type of glass of relatively strong color dispersion, while with the double objective of the invention the elimination of the lateral image errors and in particular the elimination of the astigmatic adjusting difference for the lateral image angle is brought about primarily by way of the strongly dispersing central air lens formed from the diaphragm chamber not only with respect to the sagital but also with respect to the meridional image surface. This intermediate diaphragm air space which forms the strongly dispersive air lens is provided in accordance with the invention in sharp contrast to the state of the art primarily to eliminate the comatic image error in the finite opened lateral ray course as well as for manipulating the outer axial aberrations of high order, while the front element directed toward a distant object in the new double-objective serves to provide the desired form and location of the course not only of the sagital but also of the meridional image surface over an extended viewing field. In this case the dispersive central or intermediate air lens aids only secondarily in the achievement of an anastigmatic image surface, while it serves primarily for eliminating the lateral aperture errors and reducing the aberrations of higher orders. This dispersing inner diaphragm chamber has its configuration determined in particular by the shape of the region of the diaphragm chamber at the image side where a specific curvature with respect to the front surface and thus with the surface directed toward the object is given according to the above combination and features of the invention. Thus, the course of the bundle of rays at the object side with respect to the forward component on the one hand as well as the diaphragm rays with respect to the rear component on the other hand are applied for the first time in a dominant manner to eliminate those aberrations which in correspondence with the work of V. Kapitels (pages 250 ff.) of "Die Bilderzeugung in Optischen Instrumenten" of M. V. Rohr, Band 1, DIE THEORIE DER OPTISCHEN INSTRUMENTE, Springer Verlag, Berlin 1904, are dependent upon the second and higher exponents of the aperture angle $(u, v)$ of the outer axial points.

The new objectives are therefore in their principle constructive features in the strict opposition to the double objective proposals of British Pat. No. 3799/1912, where there are a pair of Gauss objective halves positioned in inverted relation, so that the front surface directed toward the object also has the form of a concave surface, because the inverted positioning does not provide the diaphragm chamber with a dispersing refractive power but rather with a converging action and with this arrangement there is a conventional manner a forward component arranged in front of the diaphragm and having the shape of a meniscus. This meniscus shaped forward component is however, in contrast with the normal double objective arrangement curved not in a convex manner toward the diaphragm but rather is convexly curved toward the latter so that the diaphragm chamber has the configuration of a biconcave lens.

Moreover, there is in the literature an interchangeable objective component for a Gauss Lens arrangement known by way of the Swiss Pat. No. 346,706 where there is a concave dispersing surface forming the front end surface directed toward an adjacent object plane. Inasmuch as this object plane is situated in close proximity to the front focal point of the entire arrangement (see FIG. 2 and table B of the Swiss patent), with this old proposal the concave front surface in contrast with that of the invention is not directed toward a distant object and thus requires a calculation that for a parallel ray path within the lens $L_3$ is between the radii $r_5$ and $r_6$ of data table B so as to be an almost parallel ray path. For the strongly parallel ray path between these two lens surfaces of the interchangeable objective shown the object plane which is to be imaged has from the crest of the concave front surface only a short distance of $s_1 = -1.33f$. Therefore, this object plane is situated in close proximity to the forward focal point. Thus, this arrangement relates to the imaging of a close image and not to the imaging of a distant object. For these reasons also the optical operation of the forward component of the Swiss Pat. No. 346,706 cannot be compared in any way with that of the present invention. Moreover, this fundamental operational difference between the present invention and the older proposal is emphasized by the fact that none of the basic features (1) and (2) of the present invention are in any way suggested or approached by the older proposal.

Figure 2:
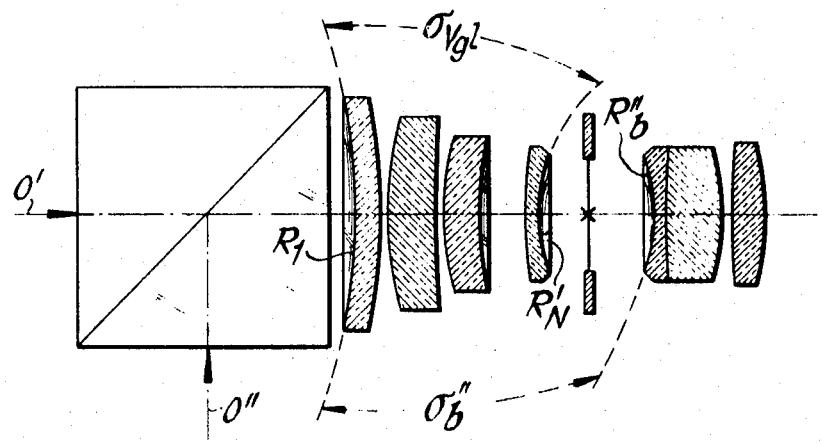
FIG. 2 shows a similar embodiment where there is located forwardly of the front concave surface a beam-splitter system.

In the above explanation of the invention the distant object referred to has in the upper limiting case an infinite distance from the new objective, so that in this case the known state of the parallel ray path prevails. This is, for example, the case with photographic pictures of distant objects, as in the case of landscapes, photographs of the sky, and the like. In the case of projection, there is an exchange of the object and image so that the projected image on the screen in situated at the location of a distant object of the photographic picture and the distance from the screen image to the objective represents the longer conjugate. It is known that the latter in conventional practice only in relatively few cases can be compared with or considered the equivalent of an infinite distance, as, for example, in the case of the photograph of a sky, since with landscape photographs the object space has a finite field while with the projection the screen image distance normally is determined by spatial limiting factors in the setting up of the projection screen which requires a given distance of the latter from the objective which normally is a finite distance between the objective the image plane. The longer conjugate is therefore defined here as that distance where the photographed object or the projected image is situated at least at a distance of 5 times the equivalent focal length of the entire objective in front of the vertex of the concave front surface of radius $R_1$, where this latter surface crosses the optical axis, with this distance also being measured along the optical axis. Inasmuch as with this arrangement the optical axis can be deflected by suitable elements such as reflectors, prisms, or the like, the distance is to measured along the deflected axis. With measurements of this latter type the axial lengths of the prisms, glass filters, or liquid cuvette are to be properly included in the calculations. This latter applies also when, for example, the beam splitter system is situated in front of the objective, as indicated in FIG. 2, so as to achieve from different objects by way of superpositioning of the rays a common image, or in the case of projection from a projection transparency (diapositive) more than only one projection image is to be directed to the image screen.

Also in these cases the invention achieves an advance with the above combination of features. This also applies to the shape of the front lens with its concave forward surface of radius $R_1$, where the special properties in the fine operation of the imaging course is primarily determined by these features and in the new operating framework first in the second line depending upon the basic dimensions chosen by the optical builder in accordance with the radii of curvature, the axial lens thicknesses and the glass refractive index as well as the lens refractive index of the front lens F.

In this case also the refractive power of the front lens is only of lesser importance. Even when the front lens has its own very small refractive power the characteristic specific action of the invention will nevertheless take place with respect to the concave front end surface which is directed toward a distant object, inasmuch as the optical builder of the objective for the first time has the possibility of exerting a corrective influence on the lateral ray course which with respect to astigmatic image point locations brings about many times the influence of the extent to which both the course of comatic deviations on the one hand and distortions such as spherical aberrations on the other hand can be influenced.

It is possible to achieve an even finer influence with the invention on the uniting of rays in the lateral viewing field parts by splitting up the front lens as is now already known with lenses when they are not built in their simplest form as one piece lenses but instead are formed by an assembly of two or more individual lens parts united into one constructive group. Also with such a front lens there are all of the advantages of the invention with respect to the superior manner of bringing about an objective which includes the combination of basic new features of the invention with the advanced development of the optical imaging system of an expanded double objective with interior diaphragm which is achieved thereby.

With this further development it is possible for the builder of the lens to apply these new principles so as to achieve an outstanding advance by providing the rest of the system which follows the front lens with a relatively large degree of curvature and astigmatic adjusting differential for both lateral image surfaces so as to enhance the construction particularly by bringing about a fine elimination of the lateral aperture error at the edge parts of the image so that then the plane of the astigmatic image surface can be directed through the front lens especially by way of its concave forwardly directed surface of radius $R_1$ at the side of the distant object. All of this is rendered more easily possible the greater the difference for the lateral primary ray inclination in the object space between the paraxial and astigmatic surface refractive powers, so that this difference is determined by the relative locations of the center of curvature of the concave front lens surface on the one hand and the location of the entrance pupil on the other hand as well as by the overcorrecting dispersive action of the hollow front lens surface.

In this connection it should be noted that the percent difference between paraxial and astigmatic surface refractive powers at this concave front surface with a high refractive index and thus with the use of extremely heavy glass does not increase with increasing refractive index but rather diminishes. On the other hand this relationship of the surface refractive powers, with increasing curvature, or in other words with a reduction in the radius of concave forward surface $R_1$, progressively increases so that there is the danger that with a construction of less than the power limits of the relationships of the invention and particularly for the lower limit of the radius $R_1$ there will be zonal intermediate errors in the off-axis image field which are undesired and which can be avoided by observing that the radius $R_1$ is not made less than the lower inventional limit. On the other hand, the influence brought about by way of this concave forward surface of the front lens on the quality of image performance in the off-axis field is all the weaker the flatter this concave radius is formed, so that for this reason it is necessary to stay within the upper limit of the length of the radius $R_1$ since with a longer radius it will no longer be possible to reliably achieve the desired results.

As has been mentioned above FIG. 1 shows the various features referred to above as well as the designations of the various parts of the objective illustrated therein which are used in the tables which follow and which further bring out the features of the invention.

FIG. 2 shows an objective as illustrated in FIG. 1 provided, however, with a beam splitter system at the side of the longer conjugate so that rays which are to be imaged can extend not only from the object direction 0′ but also from the perpendicular lateral direction 0″ in the space arranged at the side of the longer conjugate. In this way where the angular difference between these directions is 90°, which is picked as a simple example for the purpose of illustration, the beam splitter is made of a pair of partial prisms in the manner illustrated. From the known construction of such beam splitter bodies it is possible to achieve for imaging for every object direction a different light of a given color or phase condition which may be used, so that these features can be incorporated into and made use of with the structure of the invention.

Figure 3:
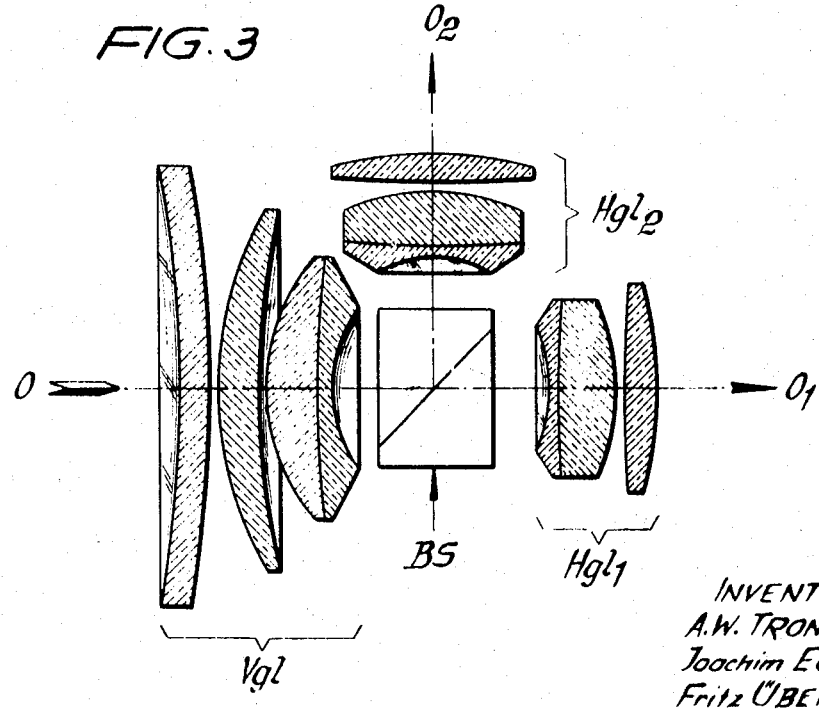
FIG. 3 is a schematic representation of an embodiment where a beam-splitter system is included in the objective between the ends thereof.

Referring to FIG. 3, the objective of the invention which is illustrated therein has a strongly dispersive interior diaphragm chamber of biconvex form at the location where the diaphragm would normally be located. However, in this case a beam splitter system BS is situated at this location with a rear component $Hgl_1$ receiving the ray 0 which continues to travel along the optical axis while a duplicate rear component $Hgl_2$ receives the deflected ray $0_2$ in the manner illustrated in FIG. 3. With this special type of system of the invention it is possible to utilize the beam splitter system in connection with known differentiation according to color or phase without going beyond the principles of the present invention with the known-planar form of the exterior surfaces.

Figure 4:
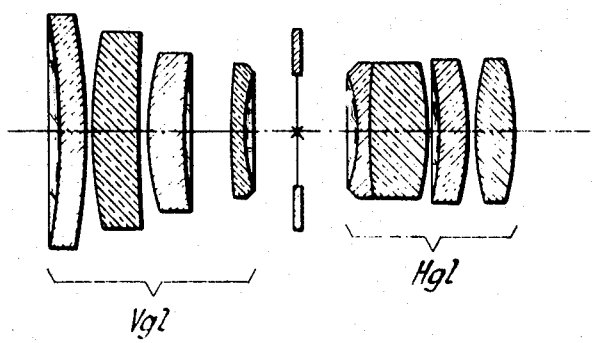
FIG. 4 is a schematic representation of an embodiment where the rear component differs from the rear component of the above embodiment.

Referring to FIG. 4 it will be seen that the rear component Hgl at the side of the shorter conjugate has a construction different from the rear component of the other embodiments. In the case of FIG. 4 the convex negative meniscus directed toward the shorter conjugate is no longer limited by a single converging lens but rather by a pair of positive elements situated in air at the image side.

Figure 5:
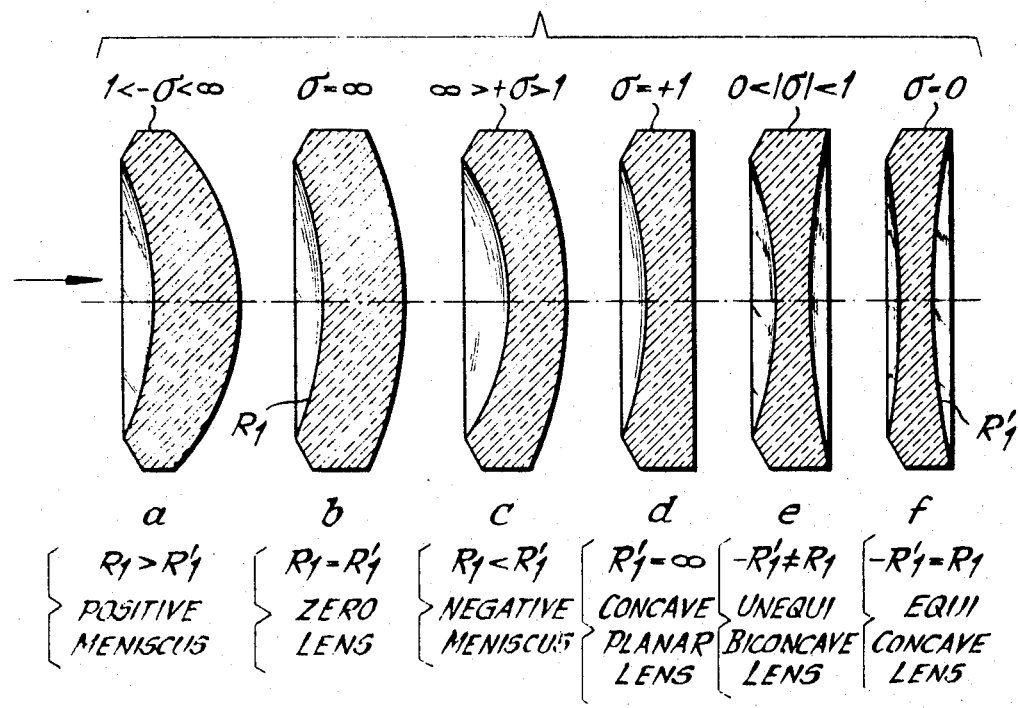
FIGS. 5 and 6 illustrate various possible configurations of the front lens structure of the objective of the invention.

FIG. 5 shows various forms of the front lens F which has at its forward concave surface the radius $R_1$. FIG. 5 illustrates the most important front lens curvatures schematically. In FIG. 5 the Gardner shape factors of the several primary lens forms illustrated are shown in parts ($a$–$f$) of FIG. 5. These curvatures are illustrated in connection with the arrow of FIG. 5 which extends from the left toward the right indicating the direction of light travel. Thus, the radius of curvature of the lens surface at the light entry side is designated with a symbol R while at the light exit side of the radius of the surface is designated by the symbol R′. The curvature of the lens progressively changes from one of the parts of FIG. 5 to the next following part. Thus, in part ($a$) of FIG. 5 the front lens $L_1$ has the shape of a positive meniscus which with increasing flattening of the rear surface goes over to the zero lens to the negative meniscus so that the side of the curvature becomes positive. With further flattening of the rear surface the lens goes from the negative meniscus over into the concave-planar lens form shown in part ($d$) of FIG. 5, and then during the continued progressive change in the curvature there will be the form first of an unequal biconcave lens, as shown in part ($e$) until finally there is an equal form of an equiconcave lens, as illustrated in part ($f$).

As is illustrated in parts ($c$–$f$) of FIG. 5, this progressive change in curvature brings about Gardner shape factors in the positive range and gradual reduction in the Gardner shape factor from infinity over the value 1 up to zero. During a further progression of the change in the shape in the same sense beyond the equiconcave lens form there will again be an unequal biconcave lens configuration whose rear side radius is more than sharply curved than the front radius so as to have a shorter length than the front radius, and thus in a known way the Gardner shape factor will change its sign from zero in the direction toward the value −1 without reaching the latter.

Figure 6:
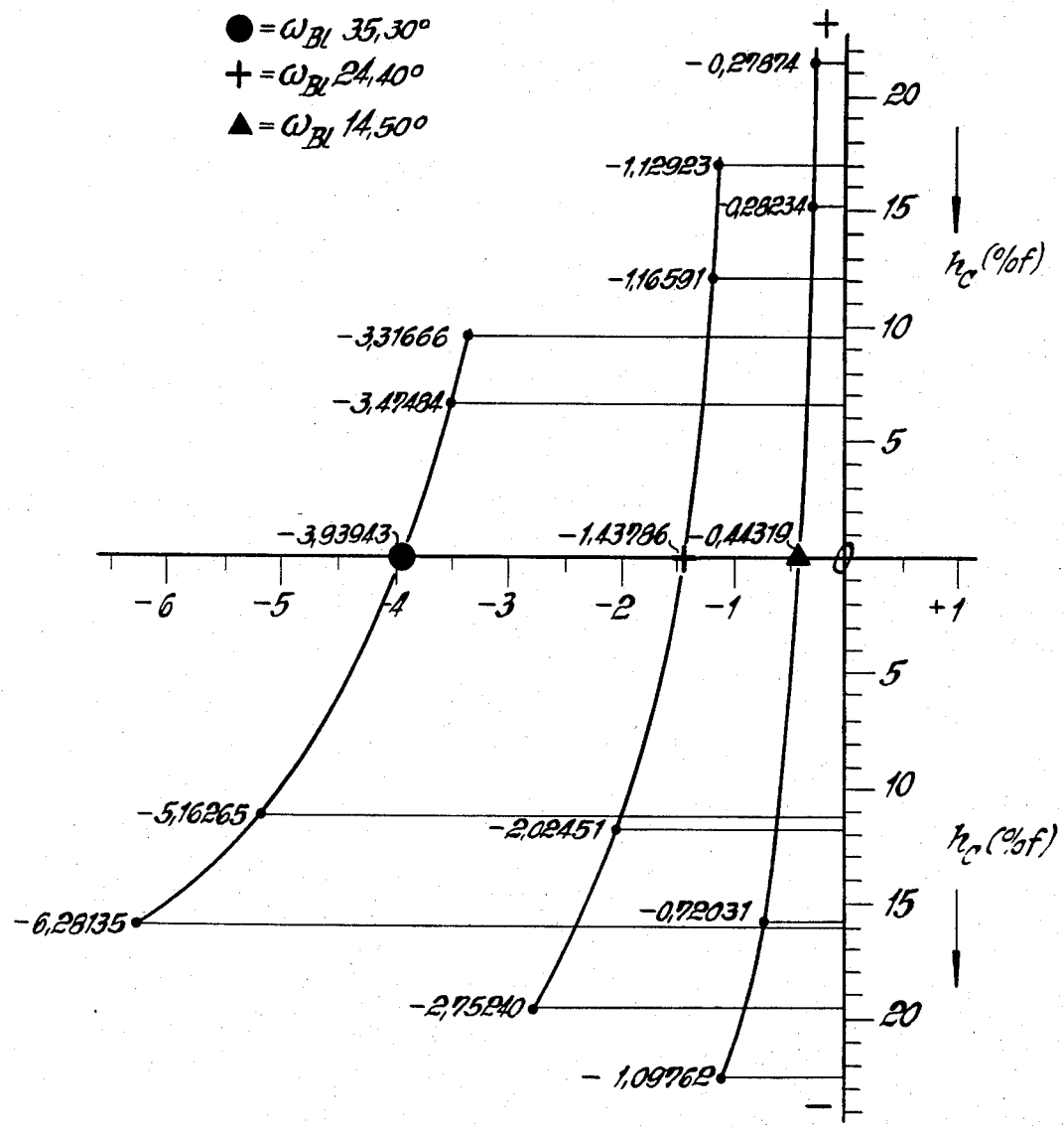

The building of a lens made up of a plurality of lens parts as referred to above, particularly with a pair of inner surfaces for the lens parts is shown by way of example in FIG. 6 for the front lens $L_1$ with its concave forward surface. This lens is thus split by including an inner pair of lens surfaces directed toward each other and forming parts of the partial lenses $l_{1a}$ and $L_{1b}$, where in correspondence with the selected sign designation the adjoining pair of inner surfaces have the radii of curvature $R'_{1a}$ and $R_{1b}$. The distance between these adjoining surfaces is designated $\delta_i$ since it is situated within the lens $L_1$. For any given position for any lens $L_i$ the latter designation $\delta_i$ will be used between a pair of adjoining surfaces designated in correspondence with the above description as $\delta_i$.

In FIG. 6 there are ten different possible types of adjoining surfaces schematically illustrated in parts ($a-k$) of FIG. 6.

In FIG. 6 the parts ($b$ and $i$) illustrate the situation of a pair of radii for the inner surfaces with both of these radii in each case being of equal magnitude and direction so that these particular embodiments are particularly suited for cementing together of the lens parts. In the other eight parts of FIG. 6 the pair of lens parts enclose between themselves a finite space which clearly illustrate that one of the features of the invention resides in the fact that the space defined between the lens parts not only has the form of an air lens but also can be filled with a light-permeable filling medium such as one of the modern transparent plastics and thus a plastic lens may be formed between the adjoining surfaces of the partial lenses so that the front lens can have the construction of a triplet.

In the following data tables there are, progressing from the top toward the bottom in a direction corresponding to the direction of light travel from the longer conjugate to the side of the shorter conjugate the series of radii of curvature R, as designated in FIG. 1 and as is applicable to the remaining embodiments, as well as the lens thicknesses measured along the optical axis and the air gaps measured along the optical axis. Moreover there is included the rear diaphragm distance as the distance from the geometric location of the diaphragm on the optical axis up to the crest of the forwardly directed concave surface of the rear component designated $b''$ while the particular glass which is used is characterized by the yellow light of the D-line of the helium spectrum and for a chromatic correction by the Abbe number $v$. For the situation where an additional system is included such as filter or light deviating arrangement or beam splitter, the latter is indicated by a pair of parallel exterior surfaces where for the sake of simplicity the outer surfaces are formed flat or planar as the limiting case between a concave or convex shape with the air-engaging limiting exterior surface form. In the data tables there is furthermore the equivalent focal length of the entire objective f. and the image side section for a distant object, measured along the optical axis and designated $s'$. Moreover there is for each example of the tables an indication of the initial relative aperture.

EXAMPLE 1

| f.=1.0<br>Radii | rel. aperture 1:2.0<br>Thickness<br>and<br>Distance | $s'$=0.710 | $n_d$ |
|---|---|---|---|
| $R_1$=−1.740 | | | |
| $L_1$ | $d_1$=0.0855 | | 1.6667 |
| $R'_1$=−1.740 | | | |
| | $a_{12}$=0.0061 | Air | |
| $R_2$=+0.615 | | | |
| $L_2$ | $d_2$=0.0591 | | 1.6203 |
| $R'_2$=+1.740 | | | |
| | $a_{22}$=0.0041 | Air | |
| $R_3$=+0.435 | | | |
| $L_3$ | $d_3$=0.0631 | | 1.6667 |
| $R'_3$=+0.988 | | | |

EXAMPLE 1 — Continued

| | $a_{34}$=0.0713 | Air | |
|---|---|---|---|
| $R_4$=+0.851 | | | |
| $L_4$ | $d_4$=0.0499 | | 1.7283 |
| $R'_4$=$R'_N$=+0.276 | | | |
| | $a_{45}$=0.1812 | diaphragm airspace<br>$b''$=0.0916 | |
| $R_5$=$R''_b$=−0.262 | | | |
| $L_5$ | $d_5$=0.0214 | | 1.5815 |
| $R'_5$=+0.768 | | | |
| | 0 | cemented | |
| $R_6$=+0.768 | | | |
| $L_6$ | $d_6$=0.0957 | | 1.6385 |
| $R'_6$=−0.369 | | | |
| | $a_{56}$=0.0020 | Air | |
| $R_7$=+2.928 | | | |
| $L_7$ | $d_6$=0.0815 | | 1.6667 |
| $R'_7$=−0.768 | | | |

EXAMPLE 2

| f.=1.0<br>Radii | rel. aperture 1:2.0<br>Thickness<br>and<br>Distance | $s'$=0.737 f. | $n_d$ |
|---|---|---|---|
| $R_1$=−1.60 | | | |
| $L_1$ | $d_1$=0.045 | | 1.6138 |
| $R'_1$=−1.76 | | | |
| | $a_{12}$=0.010 | Air | |
| $R_2$=+0.65 | | | |
| $L_2$ | $d_2$=0.090 | | 1.6910 |
| $R'_2$=+3.50 | | | |
| | $a_{22}$=0.002 | Air | |
| $R_3$=+0.45 | | | |
| $L_3$ | $d_3$=0.070 | | 1.6138 |
| $R'_3$=+0.90 | | | |
| | $a_{34}$=0.070 | Air | |
| $R_4$=+1.30 | | | |
| $L_4$ | $d_4$=0.023 | | 1.7174 |
| $R'_4$=$R'_N$=+0.305 | | | |
| | $a_{45}$=0.200 | diaphragm airspace<br>$b''$=0.110 | |
| $R_5$=$R''_b$=−0.285 | | | |
| $L_5$ | $d_5$=0.023 | | 1.6057 |
| $R'_5$=+3.50 | | | |
| | 0 | cemented | |
| $R_6$=+3.50 | | | |
| $L_6$ | $d_6$=0.100 | | 1.6910 |
| $R'_6$=−0.42 | | | |
| | $a_{56}$=0.005 | Air | |
| $R_7$=+3.50 | | | |
| $L_7$ | $d_6$=0.075 | | 1.7335 |
| $R'_7$=−0.74 | | | |

EXAMPLE 3

| f.=100.0<br>Radii | rel. aperture 1:2.0<br>Thickness<br>and<br>Distance | $s'$=73.756 | $n_d$ | $v$ |
|---|---|---|---|---|
| $R_1$=−160.648 | | | | |
| $L_1$ | $d_1$=4.518 | | 1.61380 | 56.3 |
| $R'_1$=−176.713 | | | | |
| | $a_{12}$=1.004 | Air | | |
| $R_2$=+65.263 | | | | |
| $L_2$ | $d_2$=9.036 | | 1.69105 | 53.3 |
| $R'_2$=+351.418 | | | | |
| | $a_{22}$=0.201 | Air | | |
| $R_3$=+45.182 | | | | |
| $L_3$ | $d_3$=7.028 | | 1.61380 | 56.3 |
| $R'_3$=+90.364 | | | | |
| | $a_{34}$=7.028 | Air | | |
| $R_4$=+130.527 | | | | |
| $L_4$ | $d_4$=2.309 | | 21.71740 | 29.5 |
| $R'_4$=$R'_N$=+30.624 | | | | |
| | $a_{45}$=20.081 | diaphragm airspace<br>$b''$=11.045 | | |
| $R_5$=$R''_b$=−28.615 | | | | |
| $L_5$ | $d_5$=2.309 | | 1.6057 | 38.0 |
| $R'_5$=+351.418 | | | | |
| | 0 | cemented | | |
| $R_6$=+351.418 | | | | |
| $L_6$ | $d_6$=10.041 | | 1.69095 | 54.8 |
| $R'_6$=−42.170 | | | | |

EXAMPLE 3—Continued

| | | $a_{36}$=0.502 | Air | |
|---|---|---|---|---|
| $L_7$ | $R_7$+351.418 | $d_7$=7.832 | 1.73350 | 51.0 |
| | $R'_7$−73.999 | | | |

EXAMPLE 4

| f.=100 Radii | rel. aperture 1:3.5 Thickness and Distance | | $s'$=60.4 $n_d$ | $v$ |
|---|---|---|---|---|
| $L_1$ | $R_1$=−218.215 $R'_1$=−195.160 | $d_1$=5.865 | 1.6200 | 60.3 |
| | | $a_{12}$=0.202 | Air | |
| $L_2$ | $R_2$+50.357 $R'_2$+128.523 | $d_2$=7.786 | 1.6200 | 60.3 |
| | | $a_{23}$=0.202 | Air | |
| $L_3$ | $R_3$+33.572 $R'_3$+218.215 | $d_3$=10.516 | 1.6700 | 47.2 |
| | | $a_{34}$=0 | cemented | |
| $L_4$ | $R_4$+218.215 $R'_4$=$R'_a$=+22.651 | $d_4$=1.921 | 1.6490 | 33.8 |
| | | $a_{45}$=8.140 | Air | |
| | infinite | 20.730 | 1.6205 | 60.3 |
| | infinite | 10.112 | diaphragm airspace $b''$=6.067 | |
| $L_5$ | $R_5$=$R''_a$=−27.505 $R'_5$=−654.547 | $d_{5a}$=2.629 | 1.6170 | 36.6 |
| | | 0 | cemented | |
| $L_6$ | $R_6$−654.547 $R'_6$−36.100 | $d_{5b}$=0.415 | 1.6700 | 47.2 |
| | | $a_{56}$=0.202 | Air | |
| $L_7$ | $R_7$+1011.20 $R'_7$−73.180 | $d_6$=5.865 | 1.6200 | 60.3 |

EXAMPLE 5

| f.=1.0 Radii | rel. aperture 1:1.9 Thickness and Distance | | $s'$=0.72 $n$ | |
|---|---|---|---|---|
| $L_1$ | $R_1$=−1.277 $R'_1$=−1.420 | $d_1$=0.0457 | 1.5014 | |
| | | $a_{12}$=0.0019 | Air | |
| $L_2$ | $R_2$=+0.667 $R'_2$=+4.326 | $d_2$=0.0966 | 1.6935 | |
| | | $a_{23}$=0.0042 | Air | |
| $L_3$ | $R_3$=+0.446 $R'_3$=+0.912 | $d_3$=0.0699 | 1.6177 | |
| | | $a_{34}$=0.0726 | Air | |
| $L_4$ | $R_4$=+1.344 $R'_4$=$R'_a$=+0.306 | $d_4$=0.0230 | 1.7283 | |
| | | $a_{45}$=0.1985 | diaphragm airspace $b''$=0.0787 | |
| $L_5$ | $R_5$=$R''_b$=−0.288 $R'_5$=+2.624 | $d_{5a}$=0.0255 | 1.6129 | |
| | | 0 | cemented | |
| $L_6$ | $R_6$=+2.624 $R'_6$=−0.425 | $d_{5b}$=0.0979 | 1.6968 | |
| | | $a_{56}$=0.0019 | Air | |
| $L_7$ | $R_7$=+3.659 $R'_7$=−0.752 | $d_6$=0.0634 | 1.7440 | |

EXAMPLE 6

| f.=100 Radii | rel. aperture 1:1.9 Thickness and Distance | | $s'$=72% f. $n_d$ | $v$ |
|---|---|---|---|---|
| $L_1$ | $R_1$=−128.928 $R'_1$=−142.470 | $d_1$=3.840 | 1.50140 | 56.4 |
| | | $a_{12}$=1.110 | Air | |
| $L_2$ | $R_2$=+66.327 $R'_2$=+415.097 | $d_2$=8.930 | 1.69350 | 53.3 |
| | | $a_{23}$=0.190 | Air | |
| $L_3$ | $R_3$=+44.602 $R'_3$=+92.007 | $d_3$=6.930 | 1.61770 | 49.8 |
| | | $a_{34}$=7.110 | Air | |
| $L_4$ | $R_4$=+132.347 $R'_4$=$R'_a$=+30.638 | $d_4$=2.690 | 1.72830 | 28.6 |
| | | $a_{45}$=20.170 | diaphragm airspace $b''$=7.880 | |
| $L_5$ | $R_5$=$R''_b$=−28.851 $R'_5$=+270.400 | $d_{5a}$=2.300 | 1.61290 | 37.0 |
| | | 0 | cemented | |
| $L_6$ | $R_6$=+270.400 $R'_6$=−42.508 | $d_{5b}$=10.280 | 1.69680 | 55.4 |
| | | $a_{56}$=0.190 | Air | |
| $L_7$ | $R_7$=+372.589 | $d_6$=5.760 | 1.74400 | 44.8 |

The above six examples of expanded double-anastigmats having inner diaphragms relate, in correspondence with the above examples, all to an expanded form of a known and proven Gauss objective type where there is an apparent comparison between the type and operation of the technical features of the invention and the characteristic points thereof.

In further correspondence with the above considerations there is the front lens with its concave forwardly directed surface having the form of a negative meniscus (examples 2, 3, 5 and 6) as well as a zero lens (example 1), and finally also with the form of a positive meniscus (example 4), where all three of these possible forms are included.

In the latter example 4 there is in the intermediate air space between the forward component and the rear component a beam splitter which by partial reflection achieves a second image by way of the additional rear component, as illustrated in FIG. 3. This second image is deflected by 90° with respect to the first image in correspondence with FIG. 3 and the table. By way of this beam splitter system which at the same time serves to reduce the relative aperture to 1:3.5, it is possible to provide for the pair of images in an extremely convenient manner a pair of different spectral regions, so that this arrangement can further be made use of in a very simple way to achieve both images sections of preselected colors from the image-receiving tube. In this way it is possible to show from a distant object different light wavelengths with a desired color separation and to make use of the imaging technique of the invention.

From a comparison of examples 2 and 3 as well as of examples 5 and 6 it is furthermore apparent that between a simple form which is only preliminarily corrected (examples 2 and 5), and a finely corrected form (examples 3 and 6) there need only be a very small differences in the constructive measurements, so that within the framework of the invention it is possible to have an advanced finely corrected imaging system of an expanded double-astigmat which makes it possible to go far beyond the present possibilities with the present state of the art in an outstanding manner. The several examples further show that within the framework the invention with respect to the selection of the particular glass which is used it is also possible to have the widest choice so that the technical advance which is achieved does not require a limitation to any particular glasses of extreme or unusual properties.

The next-following table shows for each of the six selected examples the above-mentioned lens refractive power ($\Phi_F$) of the concave front surface of radius $R_1$ of the front lens F which is directed toward a distant object, with these lens refractive indexes in a known way being the sum of the individual surface refractive powers of the front lens F:

| Example | Surface refractive power | Lens refractive power |
|---|---|---|
| 1 | $-0.3832\Phi$ $+0.3832\Phi$ | 0 |
| 2 | $-0.3836\Phi$ $+0.3488\Phi$ | $-0.0348\Phi$ |
| 3 | $-0.38208\Phi$ $+0.34734\Phi$ | $-0.03474\Phi$ |
| 4 | $-0.28412\Phi$ $+0.31769\Phi$ | $+0.03357\Phi$ |
| 5 | $-0.3926\Phi$ $+0.3531\Phi$ | $-0.0395\Phi$ |
| 6 | $-0.38890\Phi$ $+0.35193\Phi$ | $-0.03697\Phi$ |

In the following table the numerical values for the specific requirements (1)–(4) for the several examples 1–6:

| Example | Numerical values | Requirements |
|---|---|---|
| 1 | $\sigma_{v g1}=-1.464:+2.016=-0.72619$ $R_1=-1.740 f=-5.22/3 f$ $M_{v g1}=+2.0160+0.3391=+2.3551 f$ $\sigma_{b''}=-2.002:+1.478=-1.3545$ | (1) (2) (3) (4) |
| 2 | $\sigma_{v g1}=-1.295:1.905=-0.67979$ $R_1=-1.60 f=-4.80/3 f$ $M_{v g1}=+1.905+0.310=+2.215 f$ $\sigma_{b''}=-1.885:+1.315=-1.43346$ | (1) (2) (3) (4) |
| 3 | $\sigma_{v g1}=-130.024:+191.272=-0.67978$ $R_1=-160.648=-4.81944/3 f$ $M_{v g1}=+191.272+31.124=+222.396$ $\sigma_{b''}=-189.263:+132.033=-1.43345$ | (1) (2) (3) (4) |
| 4 | $\sigma_{v g1}=-195.564:+240.866=-0.81192$ $R_1=-218.215=-6.54645/3 f$ $M_{v g1}=+240.866+26.492=267.358$ $\sigma_{b''}=-245.720:+190.710=-1.28845$ | (1) (2) (3) (4) |
| 5 | $\sigma_{v g1}=-0.971:+1.583=-0.61339$ $R_1=-1.277=3.831/3 f$ $M_{v g1}=+1.5830+0.3139=1.896 f$ $\sigma_{b''}=-1.565:+0.989+-1.58241$ | (1) (2) (3) (4) |
| 6 | $\sigma_{v g1}=-98.290:+159.566=-0.61598$ $R_1=-128.928=-3.86784/3 f$ $M_{v g1}=+159.566+30.800=190.366$ $\sigma_{b''}=-157.779:+100.077=-1.57658$ | (1) (2) (3) (4) |

The advances achieved in such an outstanding manner by the invention with respect to manipulation of the residual aberrations by way of the expansion of a wide-aperture double-objective with interior diaphragm of the invention is particularly apparent from the next-following considerations of comparative residual aberrations, and in these considerations for an objective construction of the invention where the data variations are very close to the data of example 5. In the next following individual illustrations there are for the specific variations of the different magnitudes of the residual aberration as the result of exact digital-electronic calculations as well as graphic illustrations. Thus, in FIG. $\alpha$ of table A the effective numerical change of spherical aberration is illustrated. In partial FIG. $\beta$ the change of the location of sagital image point throughout the entire viewing field is illustrated as a function of the primary ray inclination ($\omega_{B1}$) in the diaphragm chamber. In the FIG. $\gamma$ there is the corresponding change of the course of the meridional (tangential) image point as well as finally in FIG. $\delta$ of table B illustrations of changes the aperture-pendent course of meridional coma, with respect to the particular meridional focal point for the given primary ray inclination at the diaphragm side, and in this case for three different values of the latter so that the different inclination courses of this comatic change will be readily apparent.

In all of these figures of table A and B there is thus illustration of those aberration changes designated by the shaded areas with respect to the original condition of the entire objective of the invention. It is thus apparent that in departing from the requirements of the invention the weak refracting concave front lens is eliminated and thereafter the given exact aberration course of this variation is achieved and finally the aberration difference from these calculated results are formed. In a manner which is readily apparent the curves illustrate that with the invention there is an outstanding advance of operation variations to bring about an advanced increase in the capabilities and technical uses of the structure.

With these particularly apparent examples chosen for didactic reasons there is initially upon going beyond the framework of the present invention none of the first four requirements of the invention as set forth above. Thus, considering requirement (1) in a comparison of the absolute value of 0.616 for a Gardner shape factor for the forward component the calculated objective of the invention goes over into a numerical value of 2.717 for a comparative system, where however in departing from the measurement ranges of the invention there is instead a numerical value of greater than 1 thus illustrating that the forward component in an example which does not correspond to the present invention has gone over in its outer configuration from the biconcave lens of the invention into an outer form of a concave meniscus directed toward the shorter conjugate. Requirement (2) is shown eliminated by the elimination of the concave front surface of the front lens directed toward the longer conjugate and thus is nonexistent for the remaining comparative system.

The centerpoint distance ($M_{vd}$) of both of the outer limiting radii of the forward component, measured along the optical axis from the centers of curvature of the front radius in a direction toward the center of the last dispersive radius of the forward component changes from one which is in the range of requirement (3) which will have a value of $+189\%$ f. into a value of $-8.8\%$ f. which can be compared with the range of the invention so that with this departure from the invention there is even a negative value. In this comparative case the absolute value of the Gardner shape factor goes according to requirement (4) of the invention from 1.574 for the objective system which does not conform to the invention into a numerical value 0.395 489 which is smaller than 1 and thus illustrates that both of the front radii of the forward and rear components are provided with exterior surfaces of opposed signs in strict opposition to the requirements of the present invention in the numerical range of requirement (4) both of these radii of the front surfaces of the forward and rear components must have the same signs with respect to their curvatures, and thus this latter feature forms a part of the combination of features of the present invention.

With the above comparisons of the characteristic measuring ranges the paraxial focal length changes only in an immaterial manner, namely it shortens by 0.623 percent, which is to say its variation is $-0.623$ mm. for f. =100 mm., the latter being the equivalent focal length of the entire objective. In the same way the change of the spherical aberrations is practically nonexistent since the precise calculations show that the largest variation of spherical aberration for a zonal parallel ray with a receiving elevation of 19.642% f. is only 12.1 $\mu$ (1 $\mu = 1$ micromillimeter = 1 hundred thousandth part f.). On the other hand, for the comparative case of the rear primary point distance of the last crest becomes greater by 2.716% f. in the direction toward the distant object. Because of the extremely small change of the course of the spherical aberration figure $\alpha$ of table A shows no graphically visible change since the graduations of the coordinate system of aberration change is completely covered. Thus, the outstanding advantages achieved with the construction of the invention with respect to lateral aberrations are clearly shown in the tables of curves.

We claim:
1. In an objective of relatively wide aperture, of an expanded double-anastigmat type with an inner diaphragm-space, having a forward component situated forwardly of and a rear component situated rearwardly of said diaphragm-space, said components defining between themselves a strongly dispersive air space defining a diaphragm air space in which a diaphragm is located, said components being separated by said air space with said forward component being situated at the side of the longer conjugate while said rear component is situated at the side of the shorter conjugate, said longer conjugate being that distance where the photographed object or the projected image is situated at least at a distance of five times the equivalent focal length of the entire objective in front of the front end of said forward component, and said forward component terminating at its front end in a front lens directed toward the longer conjugate on the side of the distant object and having along the optical axis a thickness smaller than one-eighth of the length of the radius of the forwardly directed surface of said front lens, without, however, being less than one eightieth of the latter radius, said front lens being followed by a Gaussian-type combination of a positive plus a negative system-component, the latter with its concave rear surface directed to said diaphragm-space, the latter being followed by another Gaussian-type combination of a negative plus a positive rear system-component having a meniscus configuration with a convex rear surface directed toward the shorter conjugate, said forward and rear components having the usual refraction-power-distributions, characteristic for the Gaussian-types, and said objective having a combination of the following features:

A. Said forward component having at its outer limiting end surfaces a configuration of a biconcave lens, the shape of which has a Gardner shape factor the absolute value of which is between 0.500 and 0.833,
   B. The concave front surface of said forward component having a radius which is greater than two-thirds of the focal length of the entire objective without, however, exceeding ten-thirds of the latter value, calculated absolutely,
   C. The distance between the center of curvature of the concave front end surface of the forward component and the center of curvature of the concave rear end surface of the forward component being equal to the sum of the absolute lengths of the radius of the concave front end surface plus the distance along the optical axis between the vertices of the front and rear end surfaces of said forward component, where the surfaces intersect the optical axis, plus the length of the radius of the rear end surface of said forward component, with this latter sum being greater than 1.20 times the focal length of the entire objective while remaining smaller than 3.80 times the focal length of the entire objective,
   D. Said dispersive inner diaphragm air space having a configuration determined in part by a concave front end surface of said rear component, said latter surface of said rear component having a radius which with respect to the radius of the front end surface of said forward component provides a Gardner shape factor which is greater than $-1.10$ without, however, exceeding $-1.80$, and
   E. The sum of the individual surface refractive powers of the front lens of said forward component having an absolute value between the limiting values of 0 and 0.30 times the refractive power of the entire objective.

2. In an objective according to claim 1, the following constructive details for a focal length f. of unity for the entire objective:

| | Radii | Vertex Distance | | Glass Properties |
|---|---|---|---|---|
| $L_1$ | $R_1=-1.74$ f. | 0.086 f. | | 1.67 |
| | $R'_1=-1.74$ f. | 0.006 f. | Air | |
| | $R_2=+0.62$ f. | | | |
| $L_2$ | | 0.059 f. | | 1.62 |
| | $R'_2=+1.74$ f. | 0.004 f. | Air | |
| | $R_3=+0.44$ f. | | | |
| $L_3$ | | 0.063 f. | | 1.67 |
| | $R'_3=+0.99$ f. | 0.071 f. | Air | |
| | $R_4=+0.85$ f. | | | |
| $L_4$ | | 0.050 f. | | 1.73 |
| | $R'_4=R'_N=+0.28$ f. | 0.181 f. | diaphragm airspace | |
| | $R_5=R''_5=-0.26$ f. | | | |
| $L_5$ | | 0.021 f. | | 1.58 |
| | $R'_5=-2.77$ f. | 0 | | |
| | $R_6=+0.77$ f. | | | |
| $L_6$ | | 0.096 f. | | 1.64 |
| | $R'_6=-0.37$ f. | 0.002 f. | Air | |
| | $R_7=+2.93$ f. | | | |
| $L_7$ | | 0.082 | | 1.67 |
| | $R'_7=-0.77$ f. | | | |

3. In an objective according to claim 1, the following constructive details for a focal length f. of unity for the entire objective:

| | Radii | Vertex Distance | | Glass Properties |
|---|---|---|---|---|
| $L_1$ | $R_1=-1.60$ f. | 0.045 f. | | 1.614 /56 |
| | $R'_1=-1.76$ f. | 0.010 f. | Air | |
| | $R_2=+0.65$ f. | | | |
| $L_2$ | | 0.090 f. | | 1.691 /53 |
| | $R'_2=+3.50$ f. | 0.002 f. | Air | |
| | $R_3=+0.45$ f. | | | |
| $L_3$ | | 0.070 f. | | 1.614 /56 |
| | $R'_3=+0.90$ f. | 0.070 f. | Air | |
| | $R_4=+1.30$ f. | | | |
| $L_4$ | | 0.023 f. | | 1.717 /29 |
| | $R'_4=R'_N=+0.31$ f. | 0.201 f. | diaphragm airspace | |
| | $R_5=R''_5=-0.29$ f. | | | |
| $L_5$ | | 0.023 f. | | 1.606 /38 |
| | $R'_5=+3.50$ f. | 0 | | |
| | $R_6=+3.50$ f. | | | |
| $L_6$ | | 0.100 f. | | 1.691 /55 |
| | $R'_6=-0.42$ f. | 0.005 f. | Air | |
| | $R_7=+3.50$ f. | | | |
| $L_7$ | | 0.077 f. | | 1.734 /51 |
| | $R'_7=-0.74$ f. | | | |

4. In an objective according to claim 1, the following constructive details for a focal length f. of unity for the entire objective:

| | Radii | Vertex Distance | | Glass Properties |
|---|---|---|---|---|
| $L_1$ | $R_1=-2.18$ f. | 0.059 f. | | 1.62 /60 |
| | $R'_1=-1.95$ f. | 0.002 f. | Air | |
| | $R_2=+0.50$ f. | | | |
| $L_2$ | | 0.078 f. | | 1.62 /60 |
| | $R'_2=+1.29$ f. | 0.002 f. | Air | |
| | $R_3=+0.34$ f. | | | |
| $L_3$ | | 0.105 f. | | 1.67 /47 |
| | $R'_3=+2.18$ f. | 0 | | |

Table—Continued

| Radii | Vertex Distance | | Glass Properties |
|---|---|---|---|
| $R_4=+2.18$ f. | | | |
| $L_4$ | 0.019 f. | | 1.65 /34 |
| $R'_4=R'_N=+0.23$ f. | | | |
| | 0.081 f. | Air | |
| $R_5=R_8^*\pm$ plan | | | |
| $L_5$ | 0.207 f. | | 1.62 /60 |
| $R'_5\pm$ plan | | | |
| | 0.101 | diaphragm airspace | |
| $R_6=-0.28$ f. | | | |
| $L_6$ | 0.026 f. | | 1.62 /37 |
| $R'_6=-6.55$ f. | | | |
| | 0 | | |
| $R_7=-6.55$ f. | | | |
| $L_7$ | 0.104 f. | | 1.67 /47 |
| $R'_7=+-0.36$ f. | | | |
| +10.1 f. | 0.002 | Air | |
| −0.73 f. | 0.059 f. | | 1.62 /60 |

5. In an objective according to claim 1, the following constructive details for a focal length f. of unity for the entire objective:

| Radii | Vertex Distance | | Glass Properties |
|---|---|---|---|
| $R_1=-1.28$ f. | | | |
| $L_1$ | 0.046 f. | – | 1.501 |
| $R'_1=-1.42$ f. | | | |
| | 0.002 f. | Air | |
| $R_2=+0.67$ f. | | | |
| $L_2$ | 0.097 f. | | 1.694 |
| $R'_2=+4.33$ f. | | | |
| | 0.004 f. | Air | |
| $R_3=+0.45$ f. | | | |
| $L_3$ | 0.070 f. | | 1.618 |
| $R'_3=+0.91$ f. | | | |
| | 0.073 f. | Air | |
| $R_4=+1.34$ f. | | | |
| $L_4$ | 0.023 f. | | 1.728 |
| $R'_4=R'_N=+0.31$ f. | | | |
| | 0.199 f. | diaphragm airspace | |
| $R_5=R_8^* =-0.29 f.$ | | | |
| $L_5$ | 0.026 f. | | 1.613 |
| $R'_5=+2.62$ f. | | | |
| | 0 | cemented | |

| Radii | Vertex Distance | | Glass Properties |
|---|---|---|---|
| $R_6=+2.62$ f. | | | |
| $L_6$ | 0.098 f. | | 1.697 |
| $R'_6=-0.43$ f. | | | |
| | 0.002 f. | Air | |
| $R_7=+3.66$ f. | | | |
| $L_7$ | 0.063 f. | | 1.744 |
| $R'_7=-0.75$ f. | | | |

6. In an objective according to claim 1, the following constructive details for a focal length f. of unity for the entire objective:

| Radii | Vertex Distance | | Glass Properties |
|---|---|---|---|
| $R_1-1.289$ f. | | | |
| $L_1$ | 0.0384 f. | | 1.5014 /56.4 |
| $R'_1-1.425$ f. | | | |
| | 0.0111 f. | Air | |
| $R_2+0.663$ f. | | | |
| $L_2$ | 0.0893 f. | | 1.6935 /53.3 |
| $R'_2+4.151$ f. | | | |
| | 0.0019 f. | Air | |
| $R_3+0.446$ f. | | | |
| $L_3$ | 0.0693 f. | | 1.6177 /49.8 |
| $R'_3+0.920$ f. | | | |
| | 0.0711 f. | Air | |
| $R_4+1.323$ f. | | | |
| $L_4$ | 0.0269 f. | | 1.7283 /28.6 |
| $R'_4=R'_N+0.306$ f. | | | |
| | 0.2017 f. | diaphragm airspace | |
| $R_5=R_8^*-0.289$ f. | | | |
| $L_5$ | 0.0230 f. | | 1.6129 /37.0 |
| $R'_5+2.704$ f. | | | |
| | 0 | | |
| $R_6+2.704$ f. | | | |
| $L_6$ | 0.1028 f. | | 1.6968 /55.4 |
| $R'_6-0.425$ f. | | | |
| | 0.0019 f. | Air | |
| $R_7+3.726$ f. | | | |
| $L_7$ | 0.0576 f. | | 1.7440 /44.8 |
| $R'_7-0.761$ f. | | | |